Patented Nov. 11, 1930

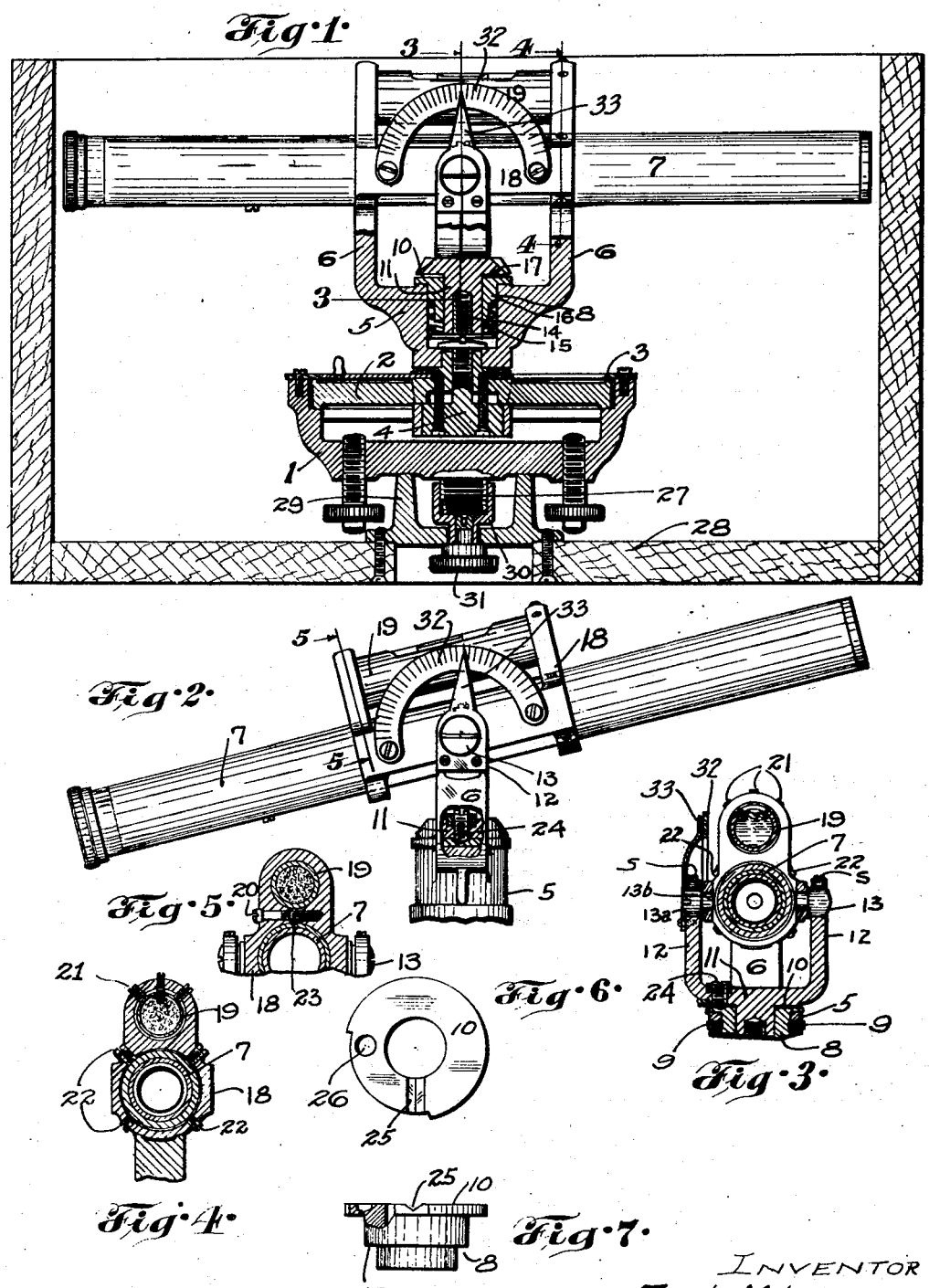

1,781,667

UNITED STATES PATENT OFFICE

FRANK MIHALYI, OF ST. LOUIS, MISSOURI, ASSIGNOR TO THE DAVID WHITE COMPANY, OF MILWAUKEE, WISCONSIN, A CORPORATION OF WISCONSIN

SURVEYING INSTRUMENT

Application filed February 3, 1928. Serial No. 251,650.

My invention relates to instruments adapted for use by surveyors as transits or levels, and consists in a novel structure in which the instrument may be changed so as to be used either as a transit, or as a level, without any disassembly of the parts, and in the mounting of such an instrument in a carrying case.

In my copending application Serial No. 153,010, filed December 6, 1926, I illustrate and describe an instrument which is adapted to be used either as a transit, or as a level, without disassembly of any parts, and including a number of devices for accurately testing and adjusting the instrument.

The object of my present invention is to provide a simple structure which may be made more economically, but which will serve the purposes of a great many users who do not require an instrument of the complexity described in my above-mentioned application.

Another object of my invention is to provide an instrument of the type referred to, in which the change from transit to level may be made with a minimum amount of manipulation.

Another object of my invention is to provide an instrument and a container therefor in which the instrument may be securely positioned by attachment of its base to the container and independently of contact with the telescope or any other delicately adjusted parts of the instrument.

In the accompanying drawings which illustrate a selected embodiment of my invention—

Figure 1 is a longitudinal section through my instrument and a container therefor, a part of the instrument being shown in elevation. The instrument, as illustrated in Figure 1, is adapted to be used as a level.

Figure 2 is an elevation of the telescope and the stand on which it is mounted, showing the same rotated ninety degrees from the position illustrated in Figure 1 and adapted to be used as a transit.

Figure 8:
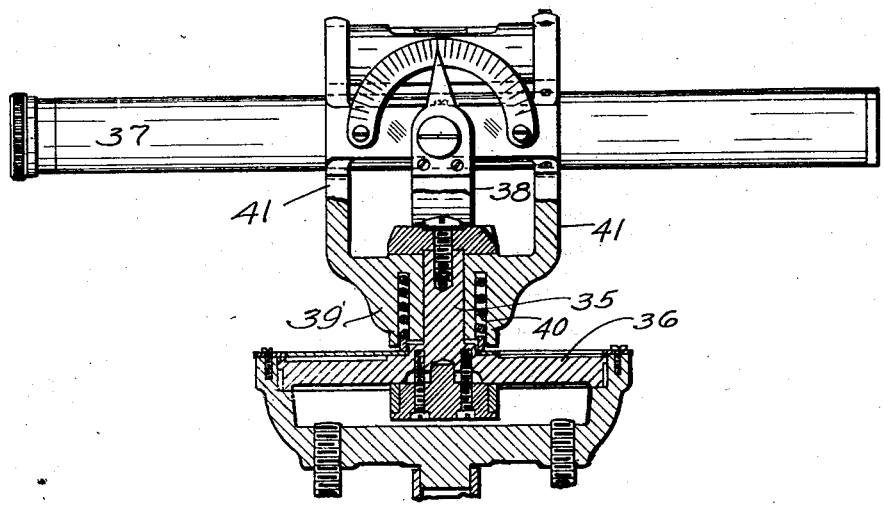

Figures 3 and 4 are vertical transverse sections taken on lines 3—3 and 4—4 of Figure 1.

Figure 5 is a vertical transverse section taken on the line 5—5 of Figure 2.

Figures 6 and 7, are, respectively, top and side views of a detail of the telescope mounting shaft bearing.

Figure 8 is a view corresponding to Figure 1 but illustrating a modified form of my invention.

The instrument includes a table 1 carrying a rotatable spider 2 and a plate 3 having graduations on its upper face. A spindle 4 is journalled in spider 2 and mounts the cross bar 5 which has a yoke-like upper portion including brackets 6 for supporting the telescope at spaced points, the telescope supporting recessed seats on these brackets having fixed vertical relation to each other and forming a rigid support for the telescope 7. A sleeve 8 is secured in cross bar 5 by means of screws 9 and is provided with an upwardly facing bearing surface 10 adapted to support a standard 11 provided with brackets 12 in which the telescope is mounted by means of a frame 18.

A screw 14, threaded into the lower end of the standard shaft 11, has a wide head which projects beyond the side of the standard and engages one end of a spring 15 which is seated at its other end upon a downwardly facing shoulder 16 formed in sleeve 8. This spring tends to thrust the standard downwardly so that its downwardly bearing surface 17 will seat on the sleeve bearing surface 10. The standard 11, with the telescope mounted thereon, may be raised, however, by manually lifting the same so as to separate surfaces 10 and 17, as indicated in Figure 1, to permit the telescope to be moved over fixed brackets 6 and seated thereon.

The frame member 18 is mounted on the brackets 12 on standard 11 by means of a pair of trunnions 13, 13$^a$. Trunnion 13 is an ordinary bearing pin. Trunnion 13$^a$ has a slotted head and its shank 13$^b$ is arranged eccentrically with respect to the axis of its head whereby the frame may be tilted vertically to level the transverse axis on which the telescope is tilted. Set screws S hold the trunnions in adjusted position.

The opposite ends of frame 18 have a pair of aligned openings for receiving the telescope 7 and another pair of aligned openings for receiving a level 19. The telescope and level fit closely in one of each pair of the aligned openings and are clamped therein by the screw 20 which draws the two sections of the frame together, the same being split vertically, as indicated at 23, to permit such clamping operation. The telescope and level are each adjustably mounted in the other opening of each pair, respectively, by means of screws 21 and 22, respectively. These screws permit the telescope and level to be adjusted laterally and vertically with respect to the frame 18 and with respect to each other and either may be adjusted without affecting the other.

An arcuate plate 32 is secured to one side of frame 18 and is provided with graduations as indicated. A pointer 33 fixed on the adjacent bracket 12 cooperates with plate 32 to enable the user to determine the angle of inclination of the telescope.

When the instrument is in use as a transit, it is desirable that the shaft 11 and cross bar standard 5 be connected so that they will rotate together, and such connection is provided by means of the screw 24 (Figure 3) which passes through the bracket portion of shaft 11 and has a pointed end adapted to engage a V-shaped groove 25 in bearing 8. When the instrument is being used as a level, and the telescope is resting on brackets 6, screw 24 is projected into a recess 26, of substantially larger diameter than the screw, so that the telescope is positioned by brackets 6 independently of any similar function by screw 24.

The table 1 is provided with a downwardly extending screw 27 whereby the instrument may be secured to a tripod in the usual manner. The bottom wall 28 of the container box is provided with a cup-shaped member 29, the rim of which is adapted to engage and support the bottom of table 1. A nut 30 having a shoulder head 31 is slidably mounted in member 29 and is adapted to be rotated by its head to engage screw 27 on the instrument table and draw the latter downwardly into tight engagement with the rim of cup 29. When this is done, the entire instrument will be firmly positioned in the container. This construction eliminates the use of brackets for engaging the barrel of the telescope, such as are commonly used, and which are likely to so loosely engage the telescope that the instrument is not firmly positioned in the box, or else are likely to so tightly engage the telescope that the latter, or its bearings, are unduly strained.

Figure 8 illustrates a modified structure in which the central standard 35 is fixedly mounted upon the spider 36 and supports telescope 37 through brackets 38 similarly to the support indicated in the preferred form of my invention.

The member 39 which is used to support the telescope in position to function as a level is slidably and rotatably mounted on the shaft of standard 35 and a spring 40 yieldingly supports member 39 in raised position.

When it is desired to change the instrument from a level to a transit, or vice-versa, member 39 may be manually depressed to permit movement of the telescope into or out of the seats formed on brackets 41.

Other variations in the details of construction may be made without departing from the spirit of my invention, and I contemplate the exclusive use of all such modifications as come within the scope of my claims.

I claim:

1. In a surveying instrument, a base, a member mounted in said base, a rotatable vertical shaft having a downwardly facing shoulder, a bearing on said member for engaging said shoulder to support said shaft, a spring yieldingly holding said shoulder to said bearing, horizontally spaced brackets carried by said shaft, a telescope mounted in said brackets and tiltable thereon in a vertical plane, and horizontally spaced rigid elements on said member for supporting said telescope in a horizontal plane when said telescope and elements are aligned.

2. In a surveying instrument, a table, a cross bar rotatably mounted thereon and including horizontally spaced fixed telescope support elements, and having a vertical recess between said elements, a sleeve removably secured in said recess and including a downwardly facing shoulder, a shaft rotatably mounted in said sleeve and including a removable upwardly facing shoulder at its lower end, a spring compressed between said shoulders, opposed cooperating bearing surfaces on said shaft and the upper face of said sleeve, a yoke-like bracket on said shaft, and a telscope trunnioned in said bracket to tilt vertically therein and adapted to be also supported on said elements when aligned therewith and when said bearing surfaces are spaced apart.

3. In a surveying instrument, a table, a cross bar rotatably mounted thereon and including fixed telescope support elements and having a vertical recess between said elements, a sleeve removably secured in said recess and including a downwardly facing shoulder, a shaft rotatably mounted in said sleeve and including a removable upwardly facing shoulder at its lower end, a spring compressed between said shoulders, opposed cooperating bearing surfaces on said shaft and the upper face of said sleeve, a yoke-like bracket on said shaft, a telescope trunnioned in said bracket to tilt vertically therein and adapted to be also supported on said elements when aligned therewith and when said bearing surfaces are spaced apart, there being a projection on one of said surfaces and a recess on the other of said surfaces for freely receiving said projection when said shaft is rotated to position said telescope over said elements, and another recess on said latter mentioned surface for engaging said projection to position said shaft when it is rotated ninety degrees from said first mentioned position.

4. In a surveying instrument, a table, a standard rotatable horizontally thereon, a telescope mounted on said standard so as to tilt vertically thereon, a cross bar, spaced elements on said cross bar for positively holding said telescope horizontal when said telescope is positioned over said elements, said standard and elements being movable vertically relatively to each other to permit disengagement of said telescope and elements, and means for yieldingly holding said standard with said telescope in engagement with said elements.

5. In a surveying instrument, a table, a cross bar thereon, a standard rotatable horizontally on said table and cross bar, a telescope mounted on said standard so as to tilt vertically thereon, spaced elements on said cross bar for positively holding said telescope horizontal when said telescope is positioned over said elements, said standard being movable vertically within said bar to permit disengagement of said telescope and elements, and means for yieldingly holding said standard with said telescope in engagement with said elements and for yieldingly holding said standard in another position with said telescope extending transversely of said elements.

6. In a surveying instrument, a cross bar having spaced support elements, an upright member journalled in said cross bar between said elements to rotate about a vertical axis, a downwardly facing shoulder on said member about said axis, yielding means thrusting said shoulder towards said cross bar, a telescope having trunnions extending transversely of its optical axis and journalled in said member, said telescope being adapted to rest on said supporting elements and, when so positioned, to elevate said member with its shoulder spaced from said cross bar.

7. In a surveying instrument, a stationary cross bar, an upright member provided with a seat on said cross bar and rotatable on its seat in a horizontal plane and slidable vertically in said cross bar to and from said seat, means yieldingly drawing said member to said seat, a telescope journalled on said member to tilt thereon in a vertical plane when said member is in one angular position, and spaced fixed elements on said cross bar for engaging said telescope and holding it horizontal when said member is in another angular position with said telescope and elements aligned.

In testimony whereof I hereunto affix my signature this 30 day of January, 1928.

FRANK MIHALYI.